(12) United States Patent
Yang et al.

(10) Patent No.: US 9,131,360 B2
(45) Date of Patent: Sep. 8, 2015

(54) APPARATUS AND METHOD OF OPEN MOBILE ALLIANCE

(75) Inventors: Ju-Ting Yang, Taoyuan County (TW); Yin-Yeh Tseng, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 683 days.

(21) Appl. No.: 13/282,279

(22) Filed: Oct. 26, 2011

(65) Prior Publication Data

US 2012/0151011 A1    Jun. 14, 2012

Related U.S. Application Data

(60) Provisional application No. 61/421,731, filed on Dec. 10, 2010, provisional application No. 61/421,760, filed on Dec. 10, 2010.

(51) Int. Cl.
| | |
|---|---|
| *G06F 15/16* | (2006.01) |
| *H04W 8/22* | (2009.01) |
| *G06F 15/173* | (2006.01) |
| *H04W 88/18* | (2009.01) |
| *H04W 4/00* | (2009.01) |

(52) U.S. Cl.
CPC ............... *H04W 8/22* (2013.01); *H04W 4/001* (2013.01); *H04W 88/182* (2013.01)

(58) Field of Classification Search
CPC ...... H04W 4/001; H04W 8/22; H04W 88/182
USPC .................. 709/217, 219, 223, 224
See application file for complete search history.

(56) References Cited

U.S. PATENT DOCUMENTS

| | | |
|---|---|---|
| 2005/0015462 A1 | 1/2005 | Lee et al. |
| 2006/0200541 A1 | 9/2006 | Wikman et al. |
| 2012/0023216 A1 | 1/2012 | Chen et al. |
| 2012/0191686 A1* | 7/2012 | Hjelm et al. ............ 707/706 |

(Continued)

FOREIGN PATENT DOCUMENTS

CN         101877861 A    11/2010

OTHER PUBLICATIONS

OMA: "Converged Personal Network Service Core Technical 1 Specification", Draft Version 1.0-Nov. 8, 2010, Open Mobile Alliance OMA-TS-CPNS Core-VI 0-20101108-D, Release date: Nov. 8, 2010.*

(Continued)

*Primary Examiner* — David Lazaro
*Assistant Examiner* — Vitali Korobov
(74) *Attorney, Agent, or Firm* — Birch, Stewart, Kolasch & Birch, LLP

(57) ABSTRACT

An apparatus of an OMA (Open Mobile Alliance) is provided in the invention. The apparatus comprises a CPNS (Converged Personal Network Service) server, a PNGW (Personal Network Gateway), and a PNE (Personal Network Element). The CPNS server is configured to transmit a device capabilities query request message which comprises a target ID (Identification). The PNGW is configured to relay the device capabilities query request message if the target ID does not indicate the PNGW. The PNE is configured to receive the device capabilities query request message through the PNGW and then to transmit a device capabilities query response message to the PNGW according to a PNE capability of the PNE if the target ID indicates the PNE. The PNGW is further configured to relay the device capabilities query response message to the CPNS server.

6 Claims, 11 Drawing Sheets

(56) References Cited

U.S. PATENT DOCUMENTS

| | | | |
|---|---|---|---|
| 2013/0077531 A1* | 3/2013 | Chu et al. | 370/255 |
| 2013/0077532 A1* | 3/2013 | Deprun et al. | 370/255 |
| 2013/0077533 A1* | 3/2013 | Deprun et al. | 370/255 |
| 2013/0086220 A1* | 4/2013 | Deprun et al. | 709/218 |
| 2013/0086246 A1* | 4/2013 | Lee et al. | 709/223 |
| 2013/0167210 A1* | 6/2013 | Chu et al. | 726/6 |
| 2013/0208626 A1* | 8/2013 | Lee et al. | 370/255 |

OTHER PUBLICATIONS

OMA: "Converged Personal Network Service Core Technical 1 Specification", Draft Version 1.0-Nov. 8, 2010, Open Mobile Alliance OMA-TS-CPNS Core-VI 0-20101025-D, Release date: Oct. 25, 2010.*

(OMA) Open Mobile Alliance, "Converged Personal Network Service Core Technical Specification", Candidate Version 1.0-May 3, 2011; OMA-TS-CPNS_Core-V1_0-20110305-C; 10 pages.

HTC: "Flow of Device Capabilities Change Notification", OMA FTP server; Dec. 14, 2010; 3 pages.

HTC: "Flow of Device Capabilities Query", OMA FTP server; Dec. 13, 2010; 3 pages.

HTC: "Message Content and Format of Device Capabilities Notification", OMA FTP server; Dec. 13, 2010; 3 pages.

HTC: "Message Content and Format of Device Capabilities Query", OMA FTP server; Dec. 13, 2010; 3 pages.

(OMA) Open Mobile Alliance, "Converged Personal Network Service Core Technical Specification", OMA-TS-CPNS_Core-V1_0-20101025-D, Draft Version 1.0, Oct. 25, 2010.

(OMA) Mobile Alliance, "Converged Personal Network Service Core Technical Specification", OMA-TS-CPNS_Core-V1_0-20101126-D, Draft Version 1.0, Nov. 26, 2010.

(OMA) Open Mobile Alliance, "Converged Personal Network Service Requirements", OMA-RD-CPNS-V1_0-20091117-C, Candidate Version 1.0, Nov. 17, 2009.

Open Mobile Alliance Ltd., "Comment Resolution Modification of Device Capabilities Change Notification.Section 8.10", Apr. 12, 2011.

Open Mobile Alliance Ltd., "Flow of Device Capabilities Change Notification", OMA-CD-CPNS-2011-0004-CR, Dec. 14, 2010.

Open Mobile Alliance Ltd., "Flow of Device Capabilities Query", OMA-CD-CPNS-2011-0003-CR, Dec. 13, 2010.

Open Mobile Alliance Ltd., "Message Content and Format of Device Capabilities Query", OMA-CD-CPNS-2011-0006-CR, Dec. 13, 2010.

Open Mobile Alliance Ltd., "Message Content and Format of Device Capabilities Query", OMA-CD-CPNS-2011-0005-CR, Dec. 13, 2010.

Open Mobile Alliance Ltd., "Modification of Message Device Capabilities Query", OMA-CD-CPNS-2011-0151R02-CR, Mar. 31, 2011.

(OMA) Open Mobile Alliance, "Converged Personal Network Service Core Technical Specification," OMA-TS-CPNS_Core-V1_0-20101108-D, Draft Version 1.0, Nov. 8, 2010, 65 pages.

(OMA) Open Mobile Alliance, "Converged Personal Network Service Core Technical Specification", OMA-TS-CPNS_Core-V1_0-20101025-D, Draft Version 1.0, Oct. 25, 2010. 31 pages.

* cited by examiner

| Element | Type | Data Type | Description |
|---|---|---|---|
| Device Capabilities Query Request Message | Element | | Its sub elements are Msg ID Target ID PN ID |
| Message ID (Msg ID) | Attribute | String | A serial number |
| Target ID | Attribute | String | If this message is sent to a PNE, the value shall be the PNE Identification of the target device. If this message is sent to a PNGW, the value shall be the PNGW Identification of the target device. |
| PN ID | Attribute | String | PN identification of target identification |

Device Capabilities Query Request Message

FIG. 3A

| Element | Type | Data Type | Description |
|---|---|---|---|
| Device Capabilities Query Response Message | Element | | Its sub elements are Msg ID Target ID DeviceCapa |
| Message ID (Msg ID) | Attribute | String | A serial number |
| Target ID | Attribute | String | If this message is sent by a PNE, the value shall be the PNE Identification of the target device. If this message is sent by a PNGW, the value shall be the PNGW Identification of the target device. |
| Device Capability (DeviceCapa) | Attribute | String | The device capability comprises at least a UI capability (UICapa) and an external capability (ExternalCapa). The UI capability comprises a Boolean value indicating whether to support a UI function, and the external capability comprises an XML (Extensible Markup Language) fragment indicating a device type and/or a video codec of the PNGW or the PNE. |

Device Capabilities Query Response Message

FIG. 3B

| Element | Type | Data Type | Description |
|---|---|---|---|
| Device Capabilities Change Notification Message | Element | | Its sub elements are Msg ID Device ID DeviceCapa |
| Message ID (Msg ID) | Attribute | String | A serial number |
| Device ID | Attribute | String | PNE Identification of the device if the message is sent by a PNE; PNGW Identification of the device if the message is sent by a PNGW. |
| Device Capability (DeviceCapa) | Attribute | String | The device capability comprises at least a UI capability (UICapa) and an external capability (ExternalCapa). The UI capability comprises a Boolean value indicating whether to support a UI function, and the external capability comprises an XML (Extensible Markup Language) fragment indicating a device type and/or a video codec of the PNGW or the PNE. |

Device Capabilities Change Notification Message

FIG. 5A

| Element | Type | Data Type | Description |
|---|---|---|---|
| Device Capabilities Change Notification Confirm Message | Element | | Its sub elements are Msg ID Target ID |
| Message ID (Msg ID) | Attribute | String | A serial number |
| Target ID | Attribute | String | CPNS server return the confirm message to the original sender. If Device Capabilities Change Notification Message is from a PNE, then this value shall be a PNE identification. If Device Capabilities Change Notification Message is from a PNGW, then this value shall be a PNGW identification. |

Device Capabilities Change Notification Confirm Message

FIG. 5B

APPARATUS AND METHOD OF OPEN MOBILE ALLIANCE

CROSS REFERENCE TO RELATED APPLICATIONS

This application claims the benefit of U.S. Provisional Application No. 61/421,731, filed on Dec. 10, 2010, and the benefit of U.S. Provisional Application No. 61/421,760, filed on Dec. 10, 2010, the entirety of which is incorporated by reference herein.

BACKGROUND OF THE INVENTION

1. Field of the Invention

The disclosure generally relates to an apparatus, and more particularly, relates to an apparatus of an OMA (Open Mobile Affiance).

2. Description of the Related Art

The Open Mobile Alliance was formed in June 2002 by nearly 200 companies representing the world's leading mobile operators, device & network suppliers, information technology companies and content providers.

Most significantly, the Open Mobile Alliance is designed to be the center of mobile service enabler specification work, helping the creation of interoperable services across countries, operators and mobile terminals that meet the needs of users. To grow the mobile market, the companies supporting the Open Mobile Alliance work towards stimulating fast and wide adoption of a variety of new, enhanced mobile information, communication and entertainment services.

The foundation of the Open Mobile Alliance was created by consolidating the efforts of the supporters of the Open Mobile Architecture initiative and the WAP Forum. In addition, the SyncML initiative, Location Interoperability Forum (LIF), MMS Group (MMS-IOP), Wireless Village, Mobile Gaming Interoperability Forum (MGIF), and Mobile Wireless Internet Forum (MWIF) have consolidated into the Open Mobile Alliance.

By linking the activities of a number of organizations, the Open Mobile Alliance can address areas that previously fell outside of the scope of all existing organizations, as well as streamlining work that may have been previously duplicated by multiple organizations.

BRIEF SUMMARY OF THE INVENTION

In one exemplary embodiment, the disclosure is directed to an apparatus of an OMA (Open Mobile Alliance), comprising: a CPNS (Converged Personal Network Service) server, transmitting a device capabilities query request message which comprises a first target ID (Identification); a PNGW (Personal Network Gateway), relaying the device capabilities query request message if the first target ID does not indicate the PNGW; and a PNE (Personal Network Element), receiving the device capabilities query request message through the PNGW and then transmitting a first device capabilities query response message to the PNGW according to a PNE capability of the PNE if the first target ID indicates the PNE, wherein the PNGW is further configured to relay the first device capabilities query response message to the CPNS server.

In another exemplary embodiment, the disclosure is directed to an apparatus of an OMA (Open Mobile Alliance), comprising: a PNE (Personal Network Element), transmitting a first device capabilities change notification message when a PNE capability of the PNE changes; a PNGW (Personal Network Gateway), relaying the first device capabilities change notification message; a CPNS (Converged Personal Network Service) server, receiving the first device capabilities change notification message through the PNGW and then transmitting a device capabilities change notification confirm message comprises a target ID (Identification) to the PNGW, wherein the PNGW is further configured to relay the device capabilities change notification confirm message to the PNE if the target ID indicates the PNE; and wherein the PNGW is further configured to transmit a second device capabilities change notification message when a PNGW capability of the PNGW changes, and the CPNS server is further configured to receive the second device capabilities change notification message and then transmit the device capabilities change notification confirm message to the PNGW.

In one exemplary embodiment, the disclosure is directed to a method of an OMA (Open Mobile Alliance), comprising the steps of: transmitting, by a CPNS (Converged Personal Network Service) server, a device capabilities query request message which comprises a first target ID (Identification); relaying, by a PNGW (Personal Network Gateway), the device capabilities query request message if the first target ID does not indicate the PNGW; receiving, by a PNE (Personal Network Element), the device capabilities query request message through the PNGW if the first target ID indicates the PNE; transmitting, by the PNE, a first device capabilities query response message to the PNGW according to a PNE capability of the PNE if the first target ID indicates the PNE; relaying, by the PNGW, the first device capabilities query response message to the CPNS server if the first target ID indicates the PNE; receiving, by the PNGW, the device capabilities query request message if the first target ID indicates the PNGW; and transmitting, by the PNGW, a second device capabilities query response message to the CPNS server according to a PNGW capability of the PNGW if the first target ID indicates the PNGW.

In another exemplary embodiment, the disclosure is directed to a method of an OMA (Open Mobile Alliance), comprising the steps of: transmitting, by a PNE (Personal Network Element), a first device capabilities change notification message when a PNE of the PNE changes; relaying, by a PNGW (Personal Network Gateway), the first device capabilities change notification message; receiving, by a CPNS (Converged Personal Network Service) server, the first device capabilities change notification message through the PNGW; transmitting, by the CPNS server, a device capabilities change notification confirm message which comprises a target ID (Identification) to the PNGW; and relaying, by the PNGW, the device capabilities change notification confirm message to the PNE if the target ID indicates the PNE.

BRIEF DESCRIPTION OF DRAWINGS

The invention can be more fully understood by reading the subsequent detailed description and examples with references made to the accompanying drawings, wherein:

FIG. 3A is a table for illustrating the device capabilities query request message according to an embodiment of the invention;

FIG. 3B is a table for illustrating the device capabilities query response message according to an embodiment of the invention;

FIG. 5A is a table for illustrating the device capabilities change notification according to an embodiment of the invention;

FIG. 5B is a table for illustrating the device capabilities change notification confirm message according to an embodiment of the invention;

DETAILED DESCRIPTION OF THE INVENTION

Figure 1:
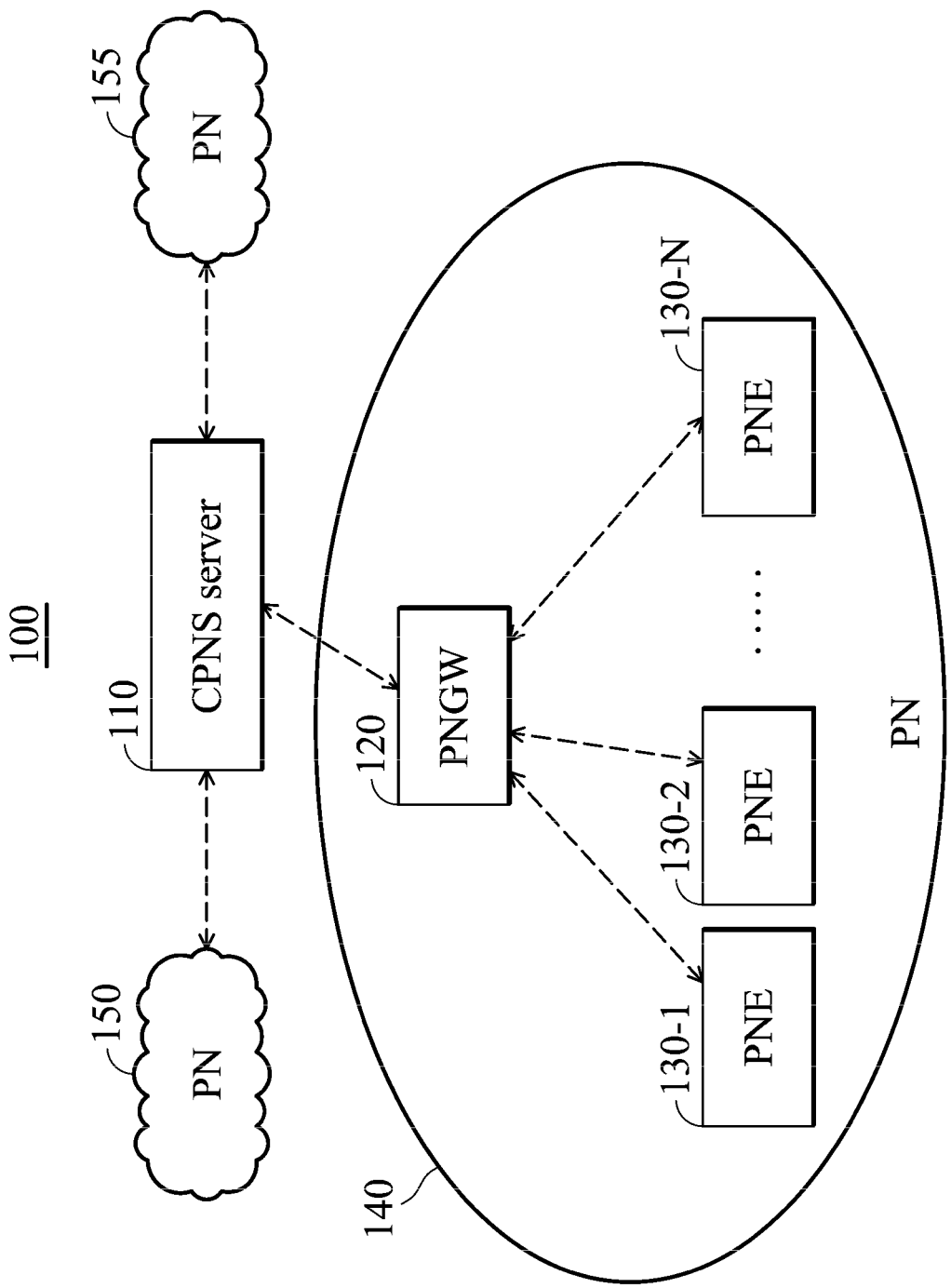
FIG. 1 is a diagram for illustrating a CPNS (Converged Personal Network Service) enabler according to an embodiment of the invention.

FIG. 1 is a diagram for illustrating a CPNS (Converged Personal Network Service) enabler 100 according to an embodiment of the invention. As shown in FIG. 1, the CPNS enabler 100 of OMA comprises a CPNS server 110 and one or more PNs (personal networks), such as PNs 140, 150, 155. The PN 140 comprises a PNGW (Personal Network Gateway) and one or more PNEs (Personal network Elements), for example, the PNEs 130-1, 130-2, ..., 130-N, wherein N is an integer greater than or equal to 1. It is noted that the PNs 150, 155 may comprise elements which are the same as those of the PN 140. The CPNS server 110 may transmit one or more messages to the one or more PNEs 130-1, 130-2, ..., 130-N through the PNGW 120. Similarly, the one or more PNEs 130-1, 130-2, ..., 130-N may also transmit one or more messages to the CPNS server 110 through the PNGW 120. In some embodiments, the CPNS server 110 may be an on-line game server or a data server, and the PNGW may be a smart phone or a tablet PC (Personal Computer), and the PNE may be an MP3 player or a smart phone.

Figure 2A:
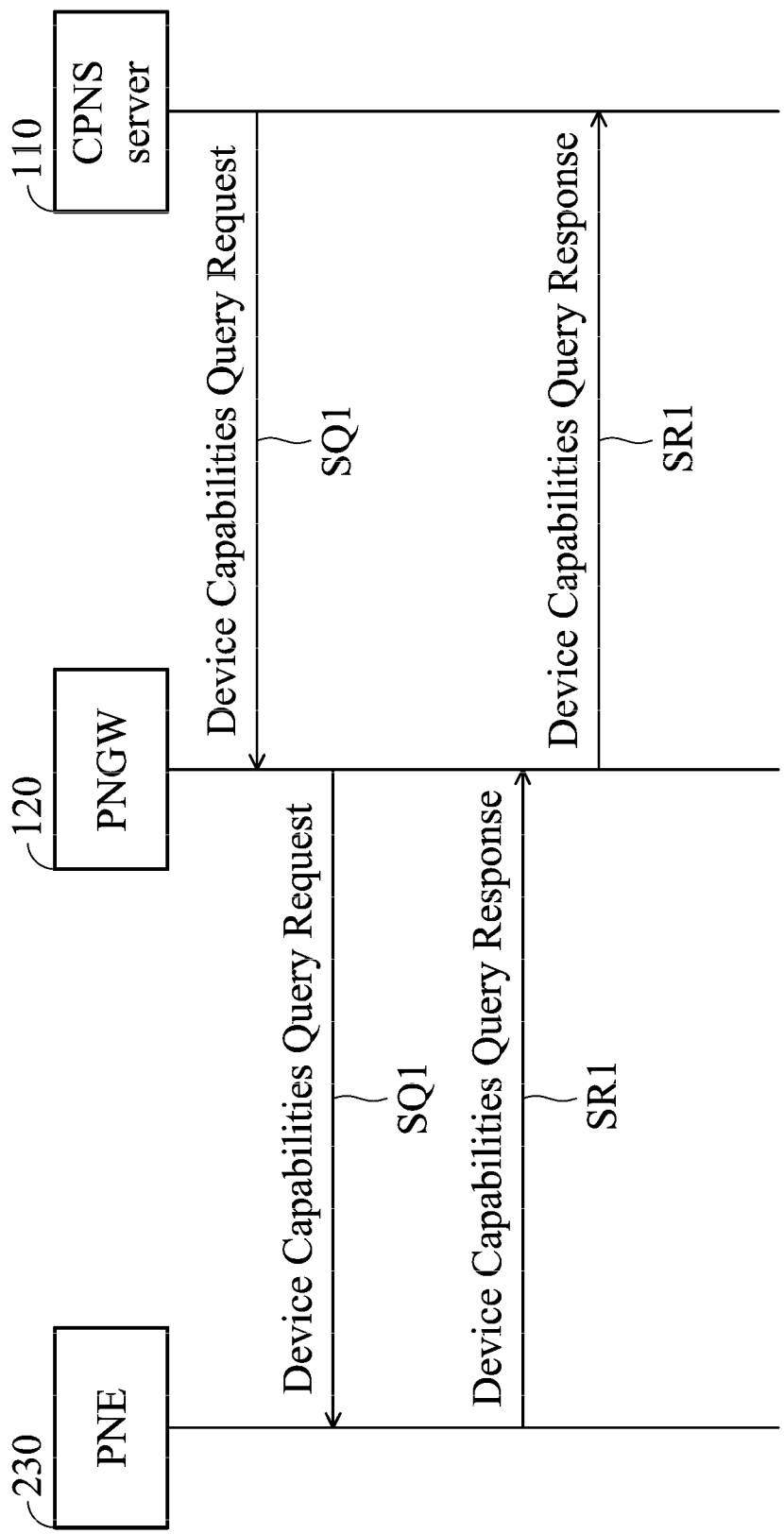
FIG. 2A is a diagram for illustrating message transmission according to an embodiment of the invention.

FIG. 2A is a diagram for illustrating message transmission according to an embodiment of the invention. As shown in FIG. 2A, there are merely the CPNS server 110, and the PNGW 120, and one PNE 230 in the CPNS enabler. In the embodiment, to begin, the CPNS server 110 transmits a device capabilities query request message SQ1 to the PNGW 120, wherein the device capabilities query request message SQ1 comprises a target ID (Identification). Then, if the target ID does not indicate the PNGW 120, the PNGW 120 relays the device capabilities query request message SQ1 to other elements. Next, if the target ID indicates the PNE 230, the PNE 230 receives the device capabilities query request message SQ1 through the PNGW 120 and then transmits a device capabilities query response message SR1 to the PNGW 120, wherein the device capabilities query response message SR1 is generated by the PNE 230 according to a PNE capability of the PNE 230. Finally, the PNGW 120 relays the device capabilities query response message SR1 to the CPNS server 110. For example, the PNE 230 may have the PNE capability as an MP3 player, an Internet browser, or a mobile phone.

Figure 2B:
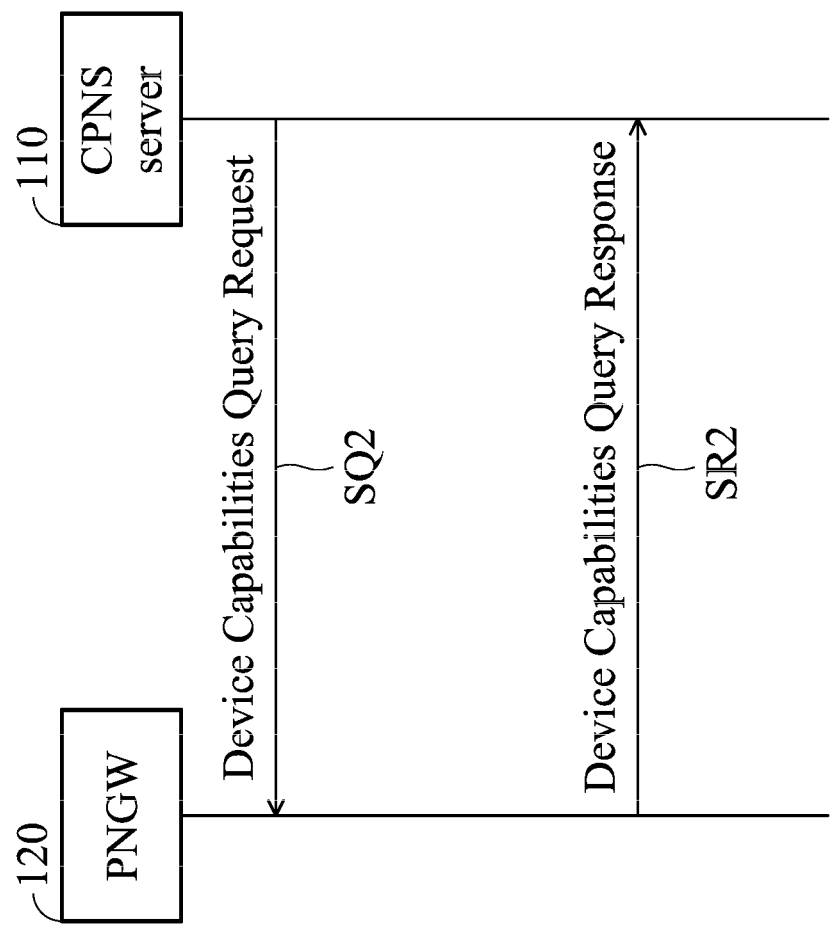
FIG. 2B is a diagram for illustrating message transmission according to another embodiment of the invention.

FIG. 2B is a diagram for illustrating message transmission according to another embodiment of the invention. In the embodiment, to begin, the CPNS server 110 transmits a device capabilities query request message SQ2 to the PNGW 120, wherein the device capabilities query request message SQ2 comprises a target ID. If the target ID indicates the PNGW 120, the PNGW 120 receives the device capabilities query request message SQ2 and then transmits a device capabilities query response message SR2 to the CPNS server 110, wherein the device capabilities query response message SR2 is generated by the PNGW 120 according to a PNGW capability of the PNGW 120. For example, the PNGW may have the PNGW capability as an MP3 player, an Internet browser, or a mobile phone. It is noted that the CPNS server 110 may transmit the device capabilities query request messages SQ1, SQ2 at intervals (e.g., periodically) or when the CPNS server 110 is initiated. In some embodiments, the CPNS server 110 may also transmit the device capabilities query request messages SQ1, SQ2 once a user input is received (not shown).

FIG. 3A is a table for illustrating the device capabilities query request message according to an embodiment of the invention. As shown in FIG. 3A, each of the device capabilities query request messages SQ1, SQ2 comprises a message ID, a target ID, and a PN ID. The message ID indicates a serial number, the target ID indicates the target device, and the PN ID indicates that the device capabilities query request message is to be sent to one of the one or more personal networks (e.g., to the PN 140). The column of "Type" indicates whether the element is of "Element" or "Attribute". In some embodiments, there might be some other values of "Type". The column of "Data type" indicates whether the element is of a string data. In some embodiments, there might be some other values of "Data type".

FIG. 3B is a table for illustrating the device capabilities query response message according to an embodiment of the invention. As shown in FIG. 3B, each of the device capabilities query response messages SR1, SR2 comprises a message ID, a target ID, and a device capability. The message ID indicates a serial number, the target ID indicates which sends the device capabilities query response message (e.g., PNGW or the PNE sends), and the device capability comprises a UI (User Interface) capability and an external capability. The UI capability comprises a Boolean value indicating whether the PNE or the PNGW supports a UT function, and the external capability comprises an XML (Extensible Markup Language) fragment indicating a device type and/or a video codec of the PNGW or the PNE.

Figure 4A:
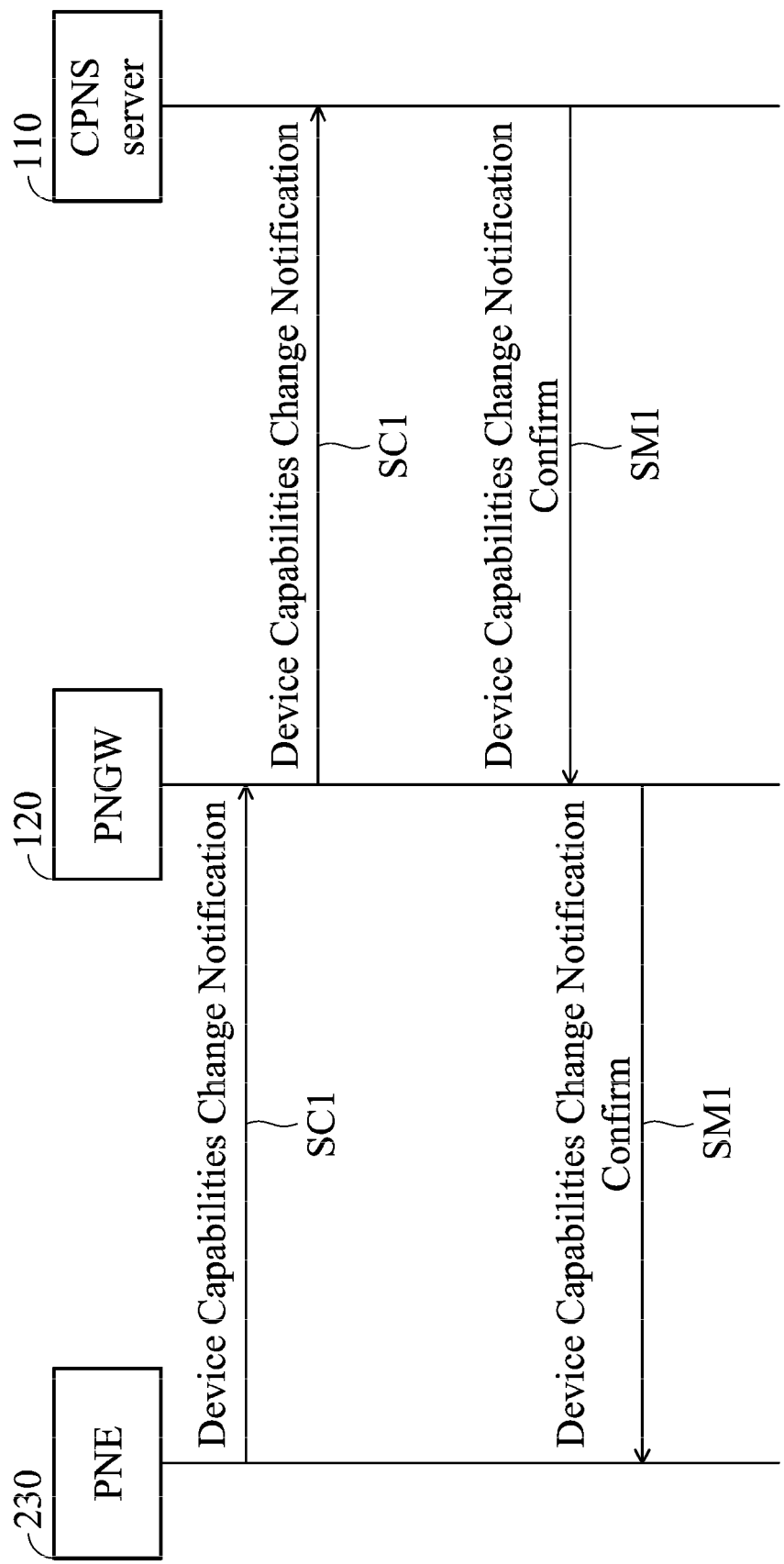
FIG. 4A is a diagram for illustrating message transmission according to an embodiment of the invention.

FIG. 4A is a diagram for illustrating message transmission according to an embodiment of the invention. As shown in FIG. 4A, there are merely the CPNS server 110, and the PNGW 120, and one PNE 230 in the CPNS enabler. In the embodiment, when a PNE capability of the PNE 230 changes (e.g., the memory of the PNE 230 increases), the PNE 230 transmits a device capabilities change notification message SC1. Then, the PNGW 120 relays the device capabilities change notification message SC1. Next, the CPNS server 110 receives the device capabilities change notification message SC1 through the PNGW 120 and then transmits a device capabilities change notification confirm message SM1 to the PNGW 120, wherein the device capabilities change notification confirm message SM1 comprises a target ID indicating the PNE 230. Finally, because the target ID indicates the PNE 230, the PNGW 120 relays the device capabilities change notification confirm message SM1 to the PNE 230.

Figure 4B:
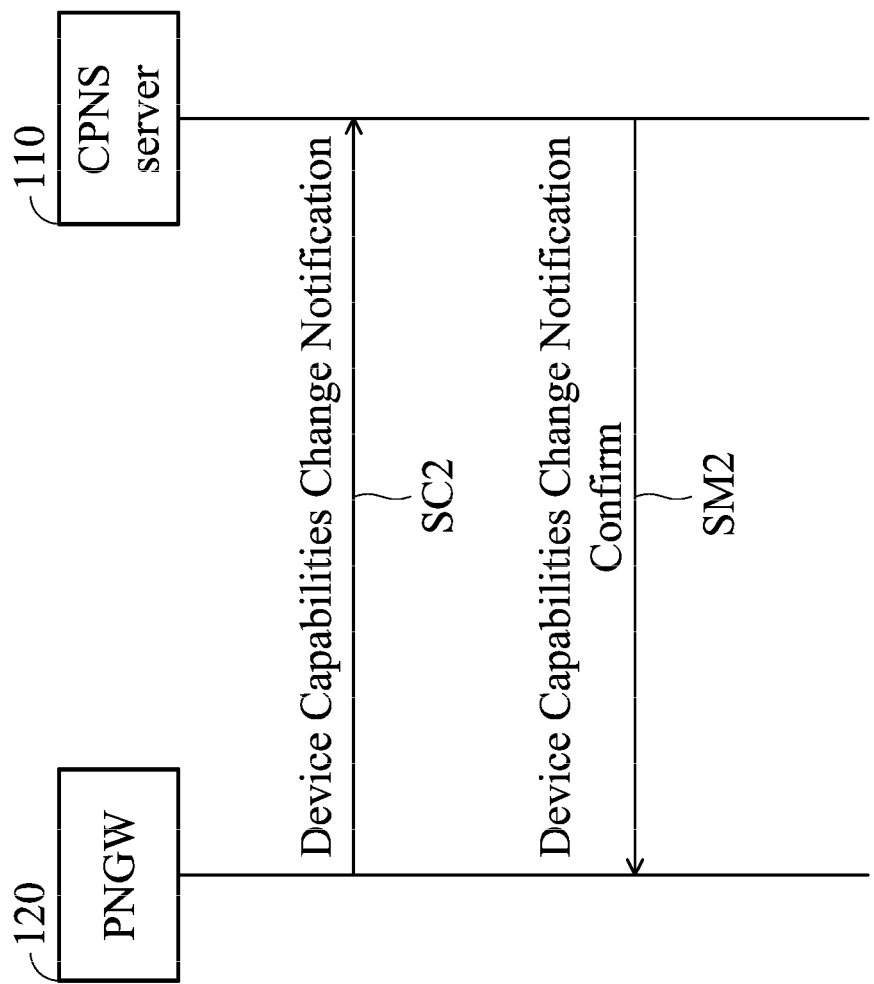
FIG. 4B is a diagram for illustrating message transmission according to another embodiment of the invention.

FIG. 4B is a diagram for illustrating message transmission according to another embodiment of the invention. In the embodiment, when a PNGW capability of the PNGW 120 changes (e.g., the memory of the PNGW 120 increases), the PNGW 120 transmits a device capabilities change notification message SC2. Then, the CPNS server 110 receives the device capabilities change notification message SC2 and then transmits a device capabilities change notification confirm message SM2 to the PNGW 120, wherein the device capabilities change notification confirm message SM2 comprises a target ID indicating the PNGW 120.

FIG. 5A is a table for illustrating the device capabilities change notification message according to an embodiment of the invention. As shown in FIG. 5A, each of the device capabilities change notification messages SC1, and SC2 comprises a message ID, a device ID, and a device capability. The message ID indicates a serial number, the device ID indicates which sends the device capabilities change notification message (e.g., PNGW or the PNE sends), and the device capability comprises a UI (User Interface) capability and an external capability. The UI capability comprises a Boolean value indicating whether the PNE or PNGW supports a UI function, and the external capability comprises an XML (Extensible Markup Language) fragment indicating a device type and/or a video codec of the PNGW or the PNE.

FIG. 5B is a table for illustrating the device capabilities change notification confirm message according to an embodiment of the invention. As shown in FIG. 5B, each of the device capabilities change notification confirm messages SM1, and SM2 comprise a message ID and a target ID. The message ID indicates a serial number, and the target ID indicates to send the device capabilities change notification confirm message to the PNE or the PNGW.

Figure 6:
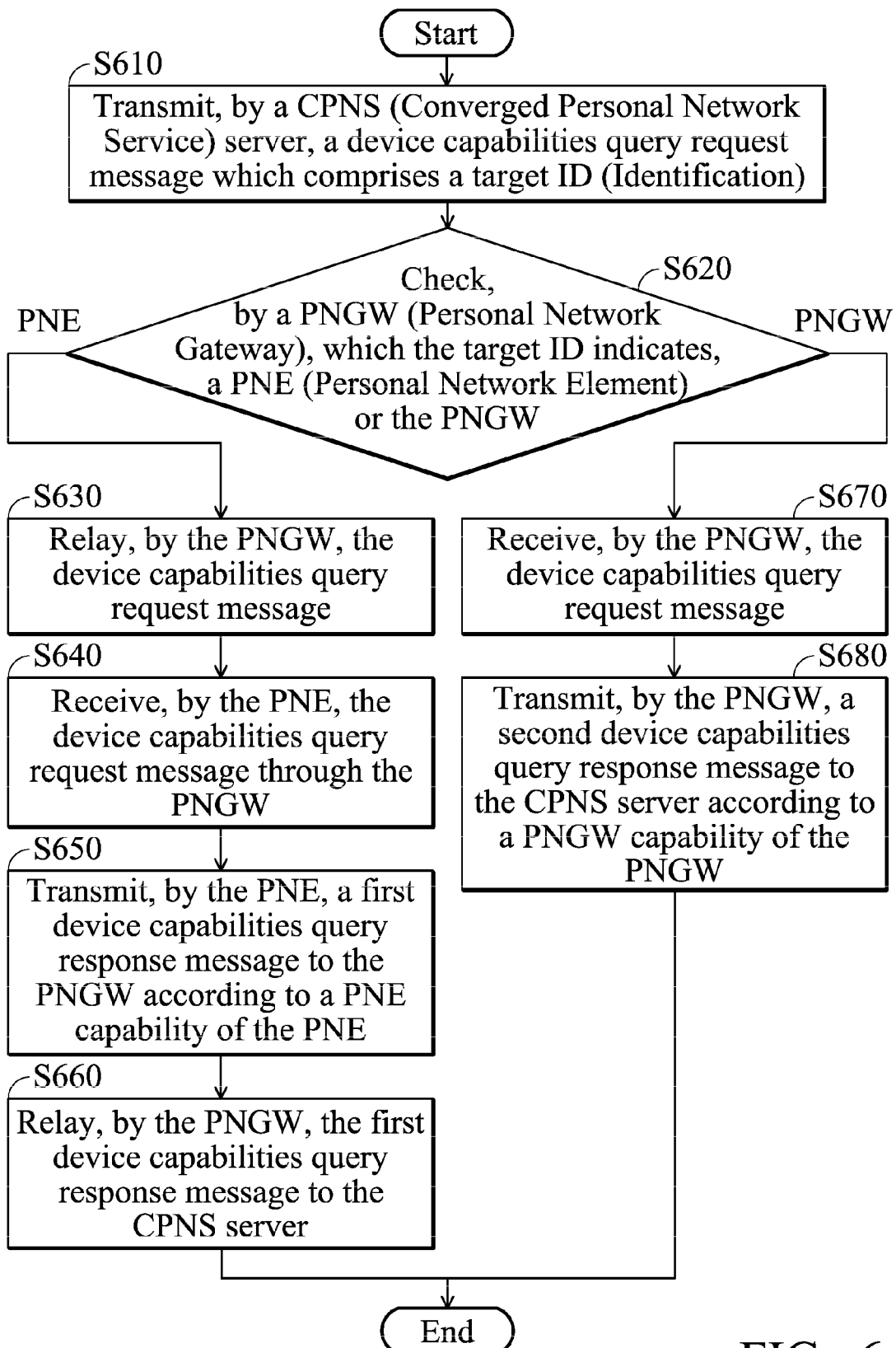
FIG. 6 is a flowchart for illustrating a method of OMA according to an embodiment of the invention.

FIG. 6 is a flowchart for illustrating a method of an OMA according to an embodiment of the invention. To begin, in step S610, a device capabilities query request message which comprises a target ID (Identification) is transmitted by a CPNS (Converged Personal Network Service) server. In step S620, in which the target ID indicates, a PNE (Personal Network Element) or the PNGW, is checked by a PNGW (Personal Network Gateway). If the PNE is indicated, in step S630, the device capabilities query request message is relayed by the PNGW. In step S640, the device capabilities query request message is received through the PNGW by the PNE. In step S650, a first device capabilities query response message to the PNGW is transmitted according to a PNE capability of the PNE by the PNE. Finally, in step S660, the first device capabilities query response message is relayed to the CPNS server by the PNGW. On the other hand, if the PNGW is indicated, in step S670, the device capabilities query request message is received by the PNGW. Finally, in step S680, a second device capabilities query response message is transmitted to the CPNS server according to a PNGW capability of the PNGW by the PNGW.

Figure 7:
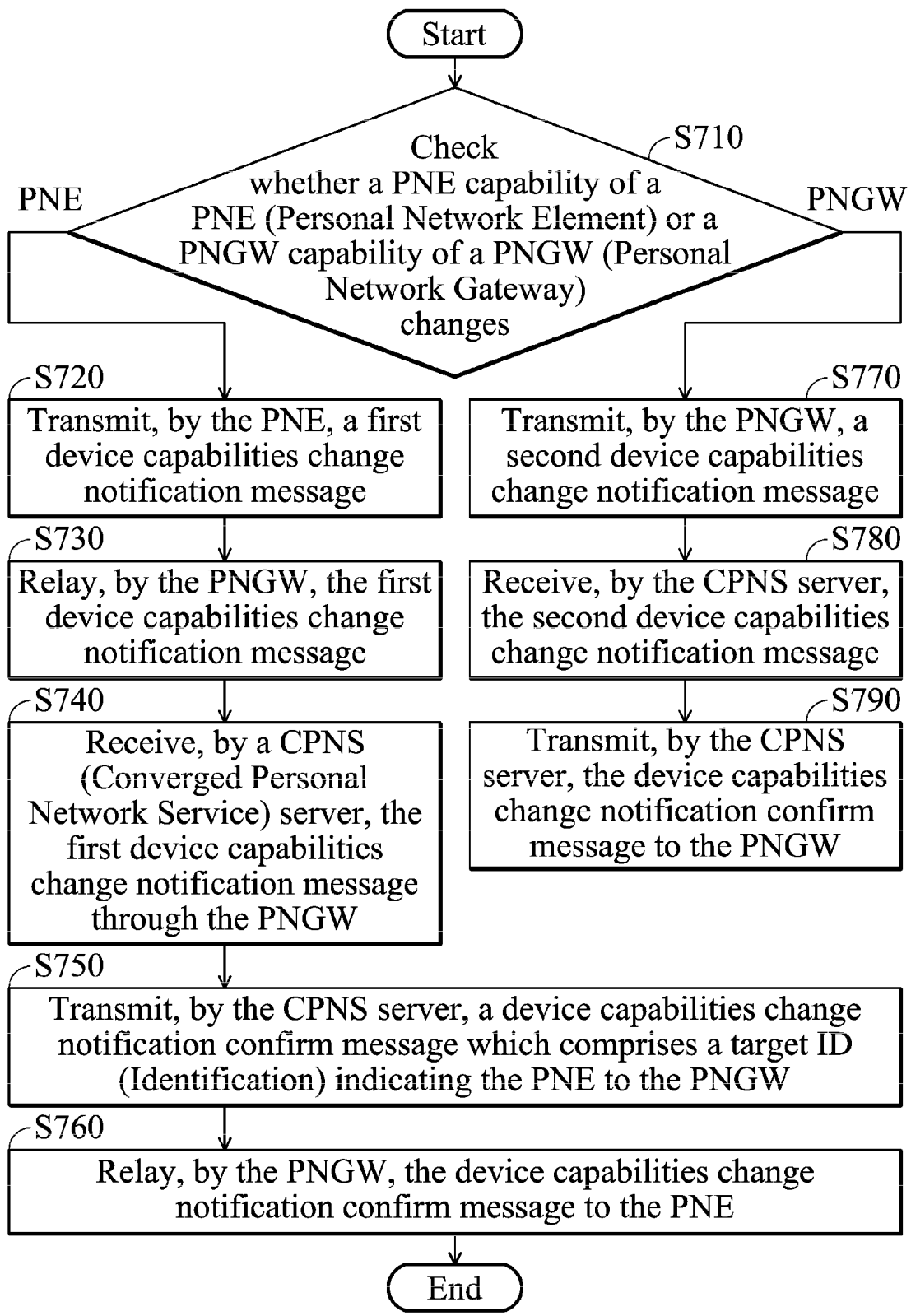
FIG. 7 is a flowchart for illustrating a method of OMA according to another embodiment of the invention.

FIG. 7 is a flowchart for illustrating a method of OMA according to another embodiment of the invention. To begin, in step S710, whether a PNE capability of a PNE (Personal Network Element) or a PNGW capability of a PNGW (Personal Network Gateway) changes is checked. When the PNE capability of the PNE changes, in step S720, a first device capabilities change notification message is transmitted by the PNE. In step S730, the first device capabilities change notification message is relayed by the PNGW. In step S740, the first device capabilities change notification message is received through the PNGW by a CPNS (Converged Personal Network Service) server. Next, in step S750, a device capabilities change notification confirm message which comprises a target ID (Identification) is transmitted to the PNGW by the CPNS server, wherein the target ID indicates the PNE. Finally, in step S760, the device capabilities change notification confirm message is relayed to the PNE by the PNGW. On the other hand, when the PNGW capability of the PNGW changes, in step S770, a second device capabilities change notification message is transmitted by the PNGW. Next, in step S780, the second device capabilities change notification message is received by the CPNS server. Finally, in step S790, the device capabilities change notification confirm message which comprises a target ID is transmitted to the PNGW by the CPNS server, wherein the target ID indicates the PNGW.

In the invention, the device capabilities query request message and the device capabilities change notification message are transmitted so as to provide the knowledge of device capabilities for the CPNS Servers. With the knowledge of device capabilities, the CPNS enabler can achieve better performance in resources assignment and utilization.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An apparatus according to specifications of an OMA (Open Mobile Alliance), comprising:
    a CPNS (Converged Personal Network Service) server, transmitting a device capabilities query request message which comprises a first target ID (Identification);
    a PNGW (Personal Network Gateway), relaying the device capabilities query request message if the first target ID does not indicate the PNGW; and
    a PNE (Personal Network Element), receiving the device capabilities query request message through the PNGW and then transmitting a first device capabilities query response message to the PNGW according to a PNE capability of the PNE if the first target ID indicates the PNE,
    wherein the PNGW is further configured to relay the first device capabilities query response message to the CPNS server.

2. The apparatus as claimed in claim 1, wherein the device capabilities query request message further comprises:
    a PN (Personal Network) ID, indicating one of a plurality of personal networks.

3. The apparatus as claimed in claim 1, wherein the CPNS server transmits the device capabilities query request message at intervals or when the CPNS server is initiated.

4. A method according to specifications of an OMA (Open Mobile Alliance), comprising the steps of:
    transmitting, by a CPNS (Converged Personal Network Service) server, a device capabilities query request message which comprises a first target ID (Identification);
    relaying, by a PNGW (Personal Network Gateway), the device capabilities query request message if the first target ID does not indicate the PNGW;
    receiving, by a PNE (Personal Network Element), the device capabilities query request message through the PNGW if the first target ID indicates the PNE;
    transmitting, by the PNE, a first device capabilities query response message to the PNGW according to a PNE capability of the PNE if the first target ID indicates the PNE; and
    relaying, by the PNGW, the first device capabilities query response message to the CPNS server if the first target ID indicates the PNE.

5. The method as claimed in claim 4, wherein the device capabilities query request message further comprises:

a PN (Personal Network) ID, indicating one of a plurality of personal networks.

6. The method as claimed in claim 4, wherein the step of transmitting, by the CPNS server, the device capabilities query request message which comprises the first target ID is performed at intervals or when the CPNS server is initiated.

* * * * *